United States Patent
Arakawa

(10) Patent No.: US 9,335,846 B2
(45) Date of Patent: May 10, 2016

(54) OPERATION INPUT USING TOUCH SCREEN AND OPERATION LEVER

(71) Applicant: KABUSHIKI KAISHA TOKAI RIKA DENKI SEISAKUSHO, Aichi (JP)

(72) Inventor: Shuri Arakawa, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 193 days.

(21) Appl. No.: 13/857,352

(22) Filed: Apr. 5, 2013

(65) Prior Publication Data

US 2013/0278517 A1    Oct. 24, 2013

(30) Foreign Application Priority Data

Apr. 18, 2012  (JP) .................................. 2012-094460

(51) Int. Cl.
| | |
|---|---|
| G06F 3/0488 | (2013.01) |
| G06F 3/041 | (2006.01) |
| G06F 3/02 | (2006.01) |
| G06F 3/023 | (2006.01) |

(52) U.S. Cl.
CPC .............. *G06F 3/041* (2013.01); *G06F 3/0205* (2013.01); *G06F 3/0234* (2013.01); *G06F 3/0236* (2013.01)

(58) Field of Classification Search
CPC .................................................... G06F 3/0338
USPC ..................... 345/173–183; 178/18.01–20.04
See application file for complete search history.

(56) References Cited

U.S. PATENT DOCUMENTS

| | | | | |
|---|---|---|---|---|
| 7,969,412 | B2 * | 6/2011 | Nagiyama et al. ............ | 345/156 |
| 2003/0067447 | A1 * | 4/2003 | Geaghan et al. .............. | 345/173 |
| 2005/0174331 | A1 * | 8/2005 | Vayda ............................ | 345/167 |
| 2006/0181517 | A1 * | 8/2006 | Zadesky ................ | G06F 1/1613 345/173 |
| 2008/0217075 | A1 * | 9/2008 | Gordner et al. ............ | 178/18.01 |
| 2010/0073291 | A1 * | 3/2010 | Hisatsugu et al. ............ | 345/161 |
| 2010/0231523 | A1 * | 9/2010 | Chou ............................ | 345/171 |

FOREIGN PATENT DOCUMENTS

| | | |
|---|---|---|
| CN | 1212395 A | 3/1999 |
| JP | H11-095912 A | 4/1999 |
| JP | 2009-026001 | 2/2009 |
| JP | 2012-010230 | 1/2012 |
| TW | 200844796 A | 11/2008 |

OTHER PUBLICATIONS

Chinese Office action for application 201310127408.0 dated Sep. 6, 2015 and Japanese translation.
Japanese Office action dated Nov. 4, 2015 and partial English translation.

* cited by examiner

Primary Examiner — Quan-Zhen Wang
Assistant Examiner — David Lee
(74) Attorney, Agent, or Firm — Roberts Mlotkowski Safran & Cole, PC

(57) ABSTRACT

An operation input device includes a detection part configured to detect an operation performed by a detected object, an operation part including an operation lever attached to the detection part and configured so as to allow an operation of the operation part in a first direction and a second direction intersecting with the first direction, and a display control part configured so as to control a display device to display on a display screen a first region that displays a first image based on the operation performed by the detected object, a second region that displays a second image based on the operation of the operation lever in the first direction, and a third region that displays a third image based on the operation of the operation lever in the second direction.

8 Claims, 2 Drawing Sheets

OPERATION INPUT USING TOUCH SCREEN AND OPERATION LEVER

The present application is based on Japanese patent application No. 2012-094460 filed on Apr. 18, 2012, the entire contents of which are incorporated herein by reference.

BACKGROUND OF THE INVENTION

1. Field of the Invention

This invention relates to an operation input device.

2. Description of the Related Art

Conventionally, a notebook-size personal computer is known that is capable of character-recognizing characters input by drawing based on tracing an input surface with a pen or a finger (for example, refer to JP-A-H11-095912).

The notebook-size personal computer is configured so as to display characters in order of higher similarity on a candidate character display region of a liquid crystal display (LCD), as a result of carrying out the character recognition.

SUMMARY OF THE INVENTION

However, the conventional notebook-size personal computer is configured such that the candidates of one character are merely displayed on the character candidate display region, thus there is a problem that a lot of operations become necessary until objective word is input, so as to reduce operability.

Accordingly, it is an object of the invention to provide an operation input device that is capable of easily inputting a word or the like intended to be input.

(1) According to one embodiment of the invention, an operation input device comprises:

a detection part configured to detect an operation performed by a detected object;

an operation part comprising an operation lever attached to the detection part and configured so as to allow an operation of the operation part in a first direction and a second direction intersecting with the first direction; and a display control part configured so as to control a display device to display on a display screen a first region that displays a first image based on the operation performed by the detected object, a second region that displays a second image based on the operation of the operation lever in the first direction, and a third region that displays a third image based on the operation of the operation lever in the second direction.

In the above embodiment (1) of the invention, the following modifications and changes can be made.

(i) The operation input device further comprises:

a memory part configured to comprise a dictionary in which a plurality of characters, a plurality of words including the characters, and a plurality of sentences including the characters are housed;

wherein the display control part is configured to recognize the character written in the detection part based on the operation of the detected object, to extract the candidates of the recognized character from the dictionary of the memory part, and to control the extracted result to be displayed on the second region as the second figure.

(ii) The display control part is configured to, after a character has been selected from the candidates of the recognized character that has been displayed on the second region as the second image by the operation of the operation lever in the first direction, extract the words or the sentences based on the selected character from the dictionary so as to be displayed on the third region as the third figure.

(iii) The display control part is configured to, after a word or a sentence has been selected from the candidates of the word or the sentence that have been displayed on the third region as the third image by the operation of the operation lever in the second direction, control the selected word or sentence to be displayed on an input region of the display screen.

(iv) The detected object comprises a finger or a pen, and the detection part comprises a touch sensor.

(v) The detection part is disposed on an top surface of the operation part to allow the operation of the finger or pen from upward, and wherein the detection part is allowed to move in the first direction and the second direction together with the operation lever.

(vi) The detection part is attached to an end of the operation lever.

(vii) The operation part further comprises a Y carriage extending in an X axis direction as the first direction and an X carriage extending in a Y axis direction as the second direction, and wherein the operation lever is allowed to move in the X axis direction and the Y axis direction by being supported by the Y carriage and the X carriage.

(viii) The first image comprises a locus of the operation made by the finger or the pen on an operation surface of the touch sensor.

(ix) The operation input device is configured so as to be disposed in a center console of a vehicle.

Effects of the Invention

According to one embodiment of the invention, an operation input device can be provided that is capable of easily inputting a word or the like intended to be input.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Summary of Embodiment

The operation input device according to the embodiment is configured to include a detection part configured to detect an operation performed by a detected object, an operation part comprising an operation lever attached to the detection part and configured so as to allow an operation of the operation part in a first direction and a second direction intersecting with the first direction, and a display control part configured so as to control a display device to display on a display screen a first region that displays a first image based on the operation performed by the detected object, a second region that displays a second image based on the operation of the operation lever in the first direction, and a third region that displays a third image based on the operation of the operation lever in the second direction.

Embodiment

Configuration of Operation Input Device 1

Figure 1A:
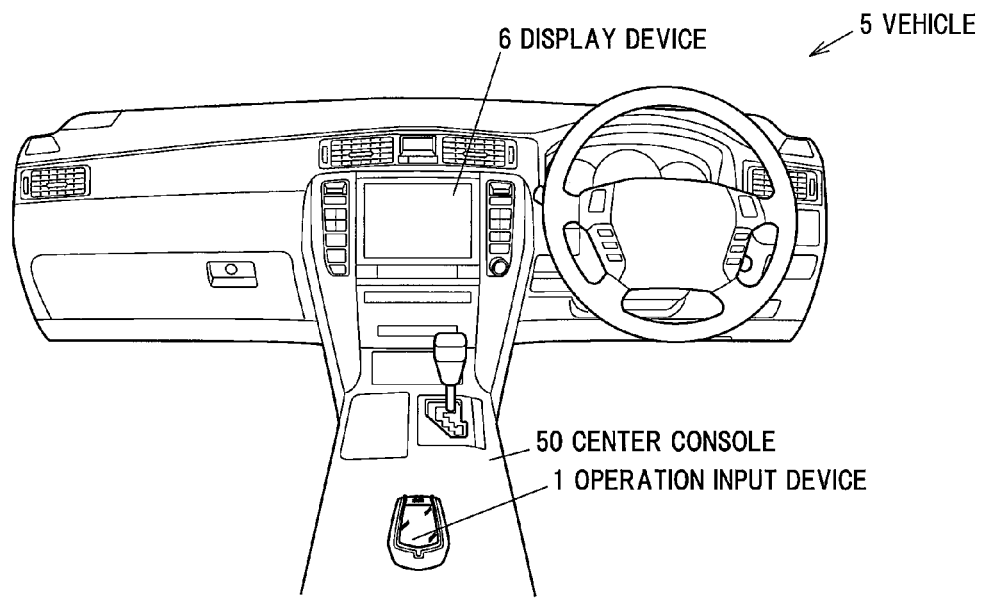
FIG. 1A is an explanatory view schematically showing an interior portion of vehicles in which an operation input device according to one embodiment of the invention is arranged.
Figure 1B:
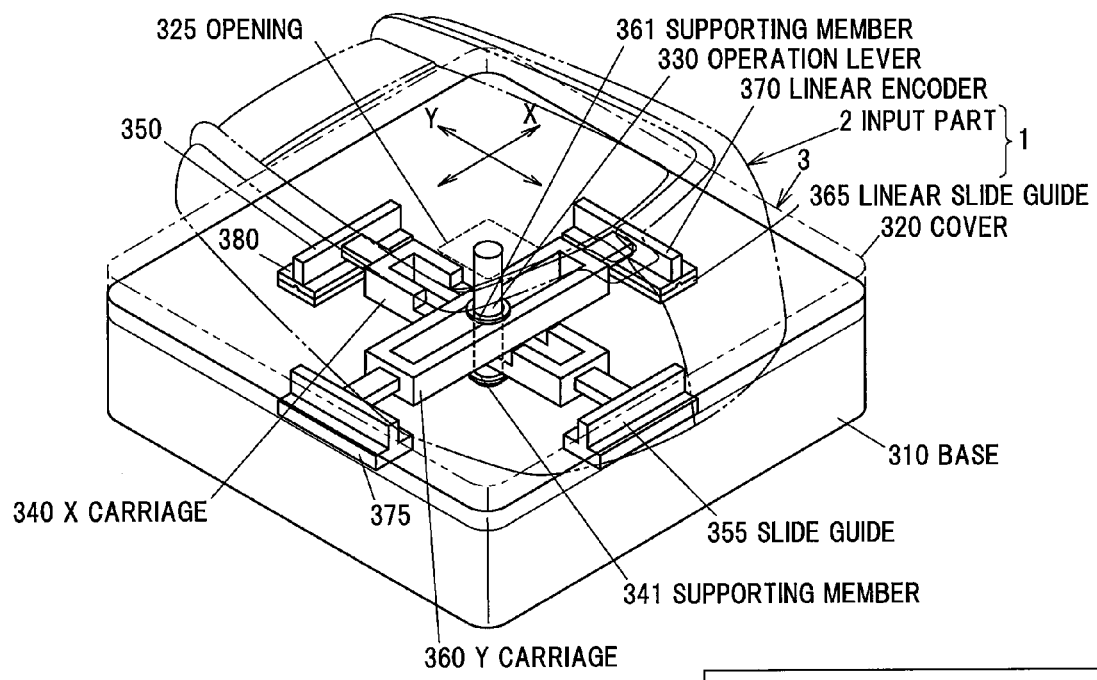
FIG. 1B is a perspective view schematically showing the operation input device according to the embodiment of the invention.
Figure 2A:
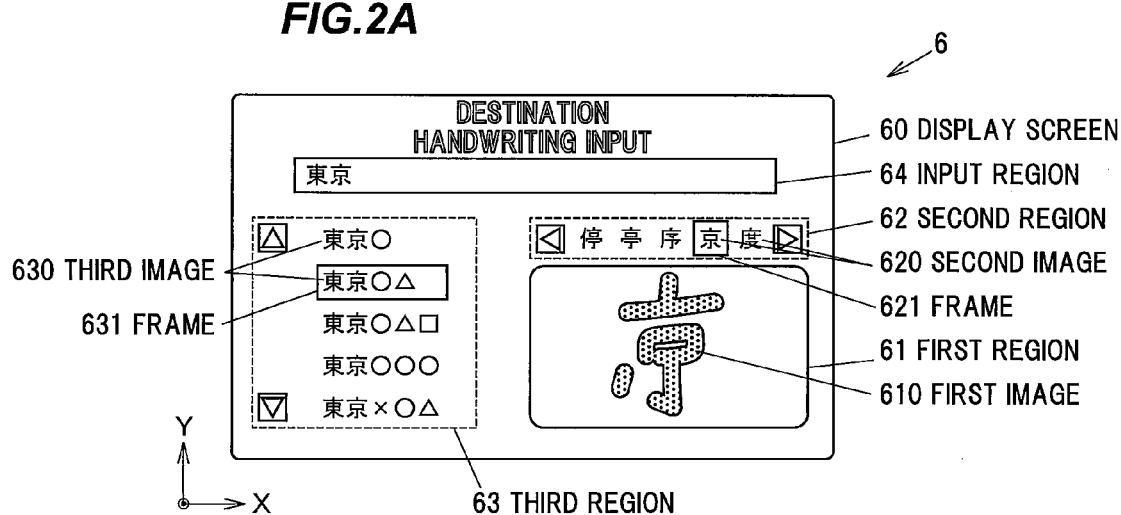
FIG. 2A is an explanatory view schematically showing a display screen of a display device to which the operation input device according to the embodiment of the invention is connected.
Figure 2B:
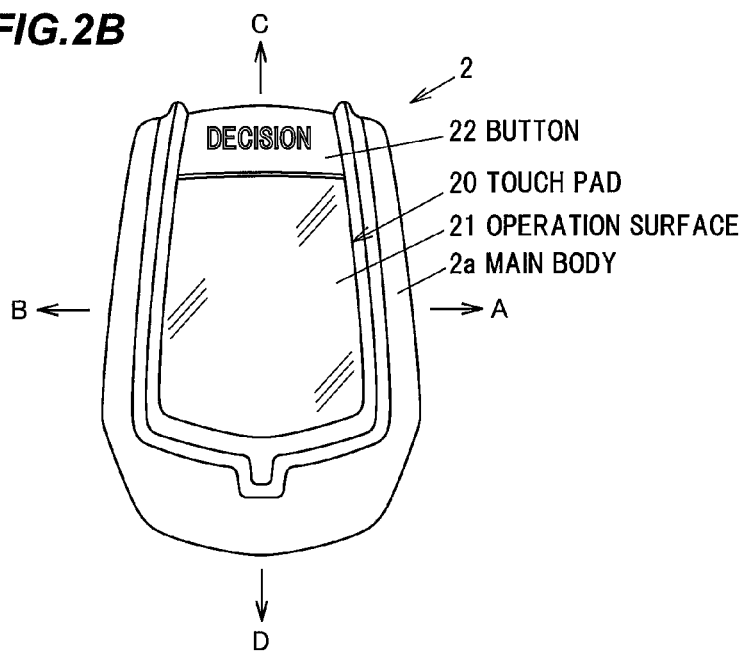
FIG. 2B is a top view schematically showing an input part of the operation input device according to the embodiment of the invention.
Figure 2C:
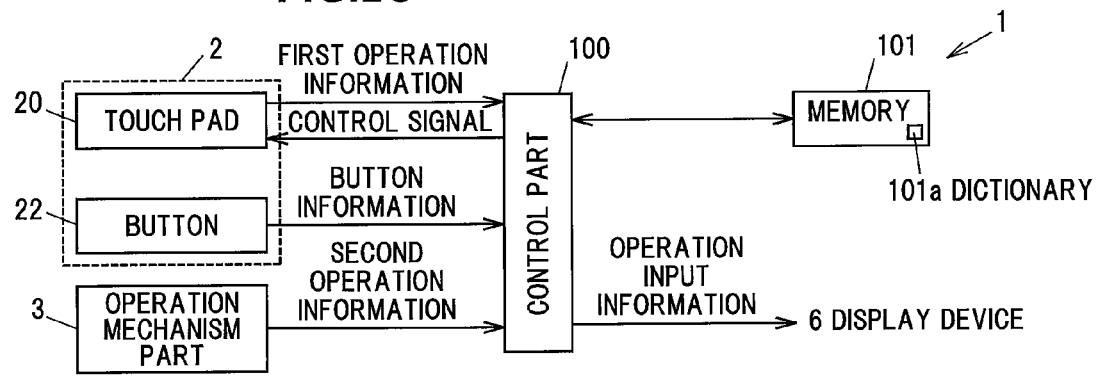
FIG. 2C is a block diagram of the operation input device according to the embodiment of the invention.

FIG. 1A is an explanatory view schematically showing an interior portion of vehicles in which an operation input device according to one embodiment of the invention is arranged, and FIG. 1B is a perspective view schematically showing the operation input device according to the embodiment of the invention. FIG. 2A is an explanatory view schematically showing a display screen of a display device to which the operation input device according to the embodiment of the invention is connected, FIG. 2B is a top view schematically showing an input part of the operation input device according to the embodiment of the invention; and FIG. 2C is a block diagram of the operation input device according to the embodiment of the invention. Further, in each of the drawings according to the embodiment, a ratio of size of components to each other may be different from the actual ratio of size of the components.

The operation input device 1 is configured to, for example, be capable of operating an electronic device to which the operation input device 1 is electrically connected. An input part 2 described below of the operation input device 1 is configured to be capable of providing instructions such as displacement or selection of a cursor displayed in a display device of the electronic device, and drag or drop of an icon displayed therein by an operation with a pen or a finger that has electric conductivity. Hereinafter, in the embodiment, an operation with a finger as an object to be detected will be explained.

As shown in FIG. 1A, the operation input device 1 is arranged in a center console 50 extending between a driver seat and a passenger seat of vehicle 5. In addition, a display device 6 is arranged in a front direction of the vehicle 5. The display device 6 is configured to be capable of displaying a menu image, an icon or the like of the electronic device to which the operation input device 1 is connected. The electronic device includes, for example, a car navigation device and a music reproduction device.

The operation input device 1 is roughly configured to mainly include the input part 2 as a detection part configured to detect an operation carried out by a finger, an operation mechanism part 3 as an operation part configured to include an operation lever 330 formed integrally with the detection part 2, and to detect operations toward a first direction and a second direction intersecting with the first direction and a control part 100 as a display control part configured to control the display device 6 to display a first region 61 that displays a first image based on the operation applied to the detection part 2, a second region 62 that displays a second image based on the operation toward the first direction of the operation mechanism part 3, and a third region 63 that displays a third image based on the operation toward the second direction of the operation mechanism part 3, on a display screen 60.

The first direction is an X-axis direction shown in FIG. 1B. In addition, the second direction is a Y-axis direction intersecting with the X-axis. The X-axis and the Y-axis are, for example, perpendicular to each other.

In addition, the operation input device 1 further includes a memory 101 as a memory part configured to include a dictionary 101a in which a plurality of characters, a plurality of words including the characters, and a plurality of sentences including the characters are housed. Further, the character represents, as one example, the Japanese cursive syllabary, the Japanese angular syllabary, Chinese character, symbol, alphabet, character of foreign language other than alphabet such as Greek character and the like. In addition, the word including the character represents, for example, character string including the character selected and decided. In case that a plurality of characters have been selected and decided, the word including the characters represents a word that includes all the selected and decided characters. Furthermore, the sentence including the character represents, for example, the sentence including the character selected and decided. In case that a plurality of characters have been selected and decided, the sentence including the characters represents a sentence that includes all the selected and decided characters. Further, the selection and decision represent, for example, a series of operations that are selected by operation of the operation mechanism part 3 via the input part 2 and are decided by push down of a button 22.

Configuration of Input Part 2

As shown in FIG. 2B, the input part 2 is configured such that a touch pad 20 and the button 22 are arranged on a main body 2a having a rectangular shape of which one end part is formed thinner than another end part. The input part 2 is arranged such that the upper side thereof in FIG. 2B is corresponding to the front direction of the vehicle 5.

The touch pad 20 is, for example, a touch sensor configured to detect a position on the operation surface 21 detected due to the fact that a part of the body of the operator (for example, a finger) or a dedicated pen comes into contact with or comes close so as to be detected to the operation surface 21. The operator becomes capable of carrying out an operation of the connected electronic device by carrying out an operation to the operation surface 21. As the touch pad 20, for example, a well-known touch panel such as resistance film type, infrared ray type, surface acoustic wave (SAW) type, electrostatic capacitance type touch panel can be used.

The touch pad 20 can be, for example, an electrostatic capacitance type touch sensor configured to detect change in electric current inversely proportional to a distance between an electrode and a finger due to the fact that a finger comes close to the operation surface 21. A plurality of electrodes (not shown) of the touch pad 20 are disposed under the operation surface 21. In addition, the touch pad 20 is configured, for example, to periodically read out the electrostatic capacitance based on a control signal output from the control part 100.

As shown in FIG. 2B, the button 22 is arranged in the front direction of the input part 2. The button 22 is configured, as one example, to be a push button and to be used when the selection is decides.

As shown in FIG. 2C, the input part 2 is configured to electrically be connected to the control part 100. The touch pad 20 is configured to output first operation information to the control part 100 based on the operation carried out. In addition, the button 22 is configured to output button information that shows the fact of having been pushed to the control part 100.

Configuration of Operation Mechanism Part 3

As shown in FIG. 1B, the operation input device 1 includes the operation mechanism part 3 that is configured to allow the input part 2 to be operated in the X-direction and the Y-direction.

As shown in FIG. 1B, the operation mechanism part 3 is configured to include a base 310 having a boxlike shape of which upper part is open, and a cover 320 configured to cover the base 310 and have an opening 325 from which an operation lever 330 projects, on the upper surface of the cover 320. The main parts of the operation mechanism part 3 are housed in the base 310.

The operation lever 330 has, for example, a circular cylindrical shape, and the input part 2 is fixed to one end part of the operation lever 330 projecting from the opening 325.

In addition, the operation mechanism part 3 is configured to include an X carriage 340 extending in the Y-axis direction and a Y carriage 360 extending in the X-axis direction.

The X carriage 340 has a quadrangular prism shape being elongated in the Y-axis direction, and has an elongated opening into which the operation lever 330 is inserted. In addition, the X carriage 340 is configured such that the one end part thereof is slidably supported on a slide guide 380, and the another end part thereof is slidably supported on a slide guide 355.

A linear encoder 350 is disposed on the slide guide 380. The linear encoder 350 is configured to detect the amount of movement in the X-axis direction of the operation lever 330.

The Y carriage 360 has a quadrangular prism shape being elongated in the X-axis direction, and has an elongated opening into which the operation lever 330 is inserted. In addition, the Y carriage 360 is configured such that the one end part thereof is slidably supported on a slide guide 365, and the another end part thereof is slidably supported on a slide guide 375.

A linear encoder 370 is disposed on the slide guide 365. The linear encoder 370 is configured to detect the amount of movement in the Y-axis direction of the operation lever 330. Consequently, the operation mechanism part 3 is configured to output the amount of movement in the X-axis direction from the linear encoder 350 and the amount of movement in the Y-axis direction from the linear encoder 370 as second operation information to the control part 100.

The operation lever 330 is supported on the X carriage 340 and the Y carriage 360, for example, so as to be movable in the X-axis direction by a supporting member 341 at the lower part of the X carriage 340, and be movable in the Y-axis direction by a supporting member 361 at the upper part of the Y carriage 360.

Configuration of Control Part 100

The control part 100 is comprised of, for example, a microcomputer that is configured to include central processing unit (CPU) configured to carry out calculation and processing to obtained date according to a program stored, random access memory (RAM) and read only memory (ROM) that are a semiconductor memory, and the like. In the ROM, for example, a program that allows the control part 100 to operate is housed. The RAM is used as, for example, a temporary storage area that temporarily stores calculation results and the like. In addition, the control part 100 includes therein a means that is configured to generate click signal, so as to carry out the operation based on the click signal.

The control part 100 is configured to calculate the coordinate of the operation applied to the operation surface 21 based on the first operation information obtained from the touch pad 20. The calculation of the coordinate is carried out, similarly to the reading out of electrostatic capacitance, based on the predetermined period according to the click signal. In addition, the control part 100 is configured to generate a control signal based on the predetermined period so as to output the control signal to the touch pad 20.

In addition, the control part 100 is configured to, after characters are selected from the candidates of recognized characters displayed on a second region 62 as a second image 620 by the operation in the X-axis direction of the operation mechanism part 3 via the input part 2, extract word or sentence based on the selected characters from a dictionary 101a so as to display the words or sentences on a third region 63 as a third image 630.

Furthermore, the control part 100 is configured to, after word or sentence is selected from the candidates of word or sentence displayed on a third region 63 as a second image 630 by the operation in the Y-axis direction of the operation mechanism part 3 via the input part 2, to display the selected word or sentence on an input region 64 of a display screen 60.

In addition, the control part 100 is configured to calculate the coordinate in the X-Y coordinate system of the input part 2 based on the second operation information obtained from the operation mechanism part 3. The control part 100 is configured to generate operation input information including information on the coordinate based on the operation applied to the touch pad 20 and the coordinate in X-Y coordinate system so as to output the operation input information to the display device 6 connected.

The operation input information generated by the control part 100 includes information configured to display the first region 61, the second region 62 and the third region 63 on the display screen 60, the first region 61 being configured to display a first image 610 based on the operation applied to the operation mechanism part 3 via the detection part 2, the second region 62 being configured to display a second image 620 based on the operation in the X-axis direction of the operation mechanism part 3 via the detection part 2, and the third region 63 being configured to display a third image 630 based on the operation in the Y-axis direction of the operation mechanism part 3 via the detection part 2.

In particular, if the operator writes characters on the operation surface 21 of the touch pad 20 by using a finger, the touch pad 20 outputs the first operation information according to the operation applied thereto, based on the control signal. The control part 100 is configured to generate the operation input information configured to display the first image 610 on the first region 61 based on the first operation information, and simultaneously to display the candidates of character obtained by comparing the character obtained by recognizing the first image 610 and the dictionary 101a on the second region 62. Further, the character obtained by recognizing the first image 610 is, for example, at least one character, and there is a case that a plurality of characters are recognized.

In addition, if the operator operates the operation mechanism part 3 in the X-axis direction via the input part 2 in order to select the candidates of the character displayed on the second region 62, the operation mechanism part 3 outputs second operation information according to the operation applied thereto. Also, if the operator pushes down the button 22 in order to decide the selected character, the button 22 outputs button information. The control part 100 is configured to generate operation input information based on the second operation information and the button information, the operation input information being configured to display the selected character on the input region 64. Furthermore, the control part 100 is configured to extract words or the like that becomes candidates by comparing the character string input to the input region 64 and the dictionary 101a, and to generate operation input information configured to display the candidates of the word or the like on the third region.

In order to select the word or the like from the third images 630 displayed on the third region 63, the operator operates the operation mechanism part 3 in the Y-axis direction via the input part 2. The operation mechanism part 3 outputs second operation information based on the above-mentioned operation. In addition, if the operator pushes down the button 22 in order to decide the selected word or the like, the button 22 outputs button information. The control part 100 is configured to generate operation input information based on the second operation information and the button information, the operation input information being configured to display the selected and decided word or the like on the input region 64.

Configuration of Display Screen 60

As shown in FIG. 2A, the display screen 60 of the display device 6 is roughly configured to include the first region 61, the second region 62, the third region 63 and the input region 64.

The first region 61 is a region configured to display the first image 610 based on the operation applied to the input part 2. Namely, the first region 61 is a region configured to display a locus of the operation applied to the operation surface 21 of the touch pad 20. The locus is displayed based on the operation continuously applied thereto.

The second region 62 is a region configured to display the candidates of the recognized character as the second image 620, in particular, the control part 100 recognizes the character written in the input part 2 based on the operation applied to the input part 2, extracts the candidates of the recognized character from the dictionary 101a of the memory 101, and displays the extracted result on the second region 62 as the second image 620.

Namely, the second region 62 displays the candidates of the character recognized by the control part 100 based on the locus of the operation applied to input part 2. The control part 100 is configured to, as one example, recognize the character by comparing the locus of the operation and the dictionary 101a so as to extract the candidates of the character. The control part 100 is configured to, as one example, recognize the character by pattern matching method so as to extract the candidates of the character.

In addition, the second region 62 is configured such that the frame 621 moves based on the operation of the operation mechanism part 3 in the arrow A direction and the arrow B direction shown in FIG. 2B via the input part 2. With regard to the character surrounded by the frame 621, the button 22 of the input part 2 is pushed down, thereby the selection thereof is decided. The character of which selection is decided is input to the input region 64. The input region 64 shown in FIG. 2A exhibits that, for example, the characters "TO" and "KYO" in Chinese character are selected and decided.

The third region 63 is a region configured to display words or sentences as the third image 630, in particular, the control part 100 extracts words or sentences from the dictionary 101a based on the character string selected and decided by the operation of the operation mechanism part 3 in the X-axis direction via input part 2, and displays the extracted result on the third region 63 as the third image 630. The above-mentioned character string represents the characters that are selected and decided by the operation in the X-axis direction and are displayed on the input region 64.

In addition, the third region 63 is configured such that the frame 631 moves based on the operation of the operation mechanism part 3 in the arrow C direction and the arrow D direction shown in FIG. 2B via the input part 2. With regard to the characters surrounded by the frame 631, the button 22 of the input part 2 is pushed down, thereby the selection thereof is decided. The characters of which selection is decided are input to the input region 64.

Hereinafter, action of the operation input device 1 according to the embodiment will be explained referring to each drawing.

Operations

The operator writes a character intended to be input on the operation surface 21 of the touch pad 20 of the input part 2.

The touch pad 20 outputs the first operation information to the control part 100 based on the operation applied thereto.

The control part 100 generates the operation input information, so as to output the operation input information to the display device 6, the operation input information being configured to display the locus of the character on the first region 61 by recognizing the character based on the first operation information obtained and comparing the recognized character and the dictionary 101a, and simultaneously to display the candidates of character on the second region 62.

The display device 6 displays the first image 610 on the first region 61 based on the operation input information obtained, and simultaneously displays the second image 620 on the second region 62.

The operator operates the input part 2 in the X-axis direction (the arrow A direction or the arrow B direction), selects the character intended to be input by the frame 621, and decides by pushing down the button 22.

The control part 100 generates the operation input information, so as to output the operation input information to the display device 6, the operation input information being configured to display the character selected and decided based on the second operation information and the button information obtained on the input region 64, and simultaneously to extract words or the like including the decided character from the dictionary 101a so as to display the words or the like on the third region 63.

The display device 6 displays the character decided based on the operation input information obtained on the input region 64, and simultaneously displays the words or the like including the decided character as the third image 630 on the third region 63.

The operator operates the input part 2 in the Y-axis direction (the arrow C direction or the arrow D direction), selects the word or the like intended to be input by the frame 631, and decides by pushing down the button 22.

The control part 100 generates the operation input information, so as to output the operation input information to the display device 6, the operation input information being configured to display the word or the like selected and decided based on the second operation information and the button information obtained on the input region 64.

The display device 6 displays the word or the like decided based on the obtained operation input information on the input region 64.

Advantages of Embodiment

The operation input device 1 according to the embodiment is capable of easily inputting a word or the like intended to be input. In particular, the operation input device 1 can display a word or the like including the candidates of the character instead of displaying only the candidates of the character, thus the operator can be reduced in input loading.

In addition, the operation input device 1 can select the candidates of the character by operating the operation mechanism part 3 via input part 2 in the X-axis direction, and can select the word or the like including the selected character by operating the operation mechanism part 3 via input part 2 in the Y-axis direction, thus the operator can input the word or the like intended to be input easily and at a short time.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An operation input device, comprising:
 a touch sensor configured to detect a touch operation performed by a detected object without requiring a contact with a contact point except the touch sensor;
 an operation part comprising an operation lever attached to the touch sensor and configured so as to allow an operation of the operation part in a first direction and a second direction intersecting with the first direction;
 a display control part configured so as to control a display device to display on a display screen a first region that displays a first image based on the operation performed by the detected object, a second region that displays a second image based on the operation of the operation lever in the first direction, and a third region that displays a third image based on the operation of the operation lever in the second direction; and
 a memory part configured to comprise a dictionary in which a plurality of characters, a plurality of words including the characters, and a plurality of sentences including the characters are housed,
 wherein the display control part is configured to recognize the character written in the touch sensor based on the operation of the detected object, to extract the candidates of the recognized character from the dictionary of the memory part, and to control the extracted result to be displayed on the second region as the second image, and
 wherein the display control part is configured to, after a character has been selected from the candidates of the recognized character that has been displayed on the second region as the second image by the operation of the operation lever in the first direction, extract the words or the sentences based on the selected character from the dictionary so as to be displayed on the third region as the third image.

2. The operation input device according to claim 1, wherein the display control part is configured to, after a word or a sentence has been selected from the candidates of the word or the sentence that have been displayed on the third region as the third image by the operation of the operation lever in the second direction, control the selected word or sentence to be displayed on an input region of the display screen.

3. The operation input device according to claim 1, wherein the detected object comprises a finger or a pen.

4. The operation input device according to claim 3, wherein the touch sensor is disposed on a top surface of the operation part to allow the operation of the finger or pen from upward, and
 wherein the touch sensor is allowed to move in the first direction and the second direction together with the operation lever.

5. The operation input device according to claim 3, wherein the first image comprises a locus of the operation made by the finger or the pen on an operation surface of the touch sensor.

6. The operation input device according to claim 1, wherein the touch sensor is attached to an end of the operation lever.

7. The operation input device according to claim 6, wherein the operation part further comprises a Y carriage extending in an X axis direction as the first direction and an X carriage extending in a Y axis direction as the second direction, and
 wherein the operation lever is allowed to move in the X axis direction and the Y axis direction by being supported by the Y carriage and the X carriage.

8. The operation input device according to claim 1, wherein the operation input device is configured so as to be disposed in a center console of a vehicle.

* * * * *

UNITED STATES PATENT AND TRADEMARK OFFICE
CERTIFICATE OF CORRECTION

PATENT NO.        : 9,335,846 B2
APPLICATION NO.   : 13/857352
DATED             : May 10, 2016
INVENTOR(S)       : Shuri Arakawa It is certified that error appears in the above-identified patent and that said Letters Patent is hereby corrected as shown below:

On the title page, item (54) and in the specification, column 1, line 1, should read:

OPERATION INPUT DEVICE USING TOUCH SCREEN AND OPERATION LEVER

Signed and Sealed this
Twelfth Day of July, 2016

Michelle K. Lee
*Director of the United States Patent and Trademark Office*